UNITED STATES PATENT OFFICE.

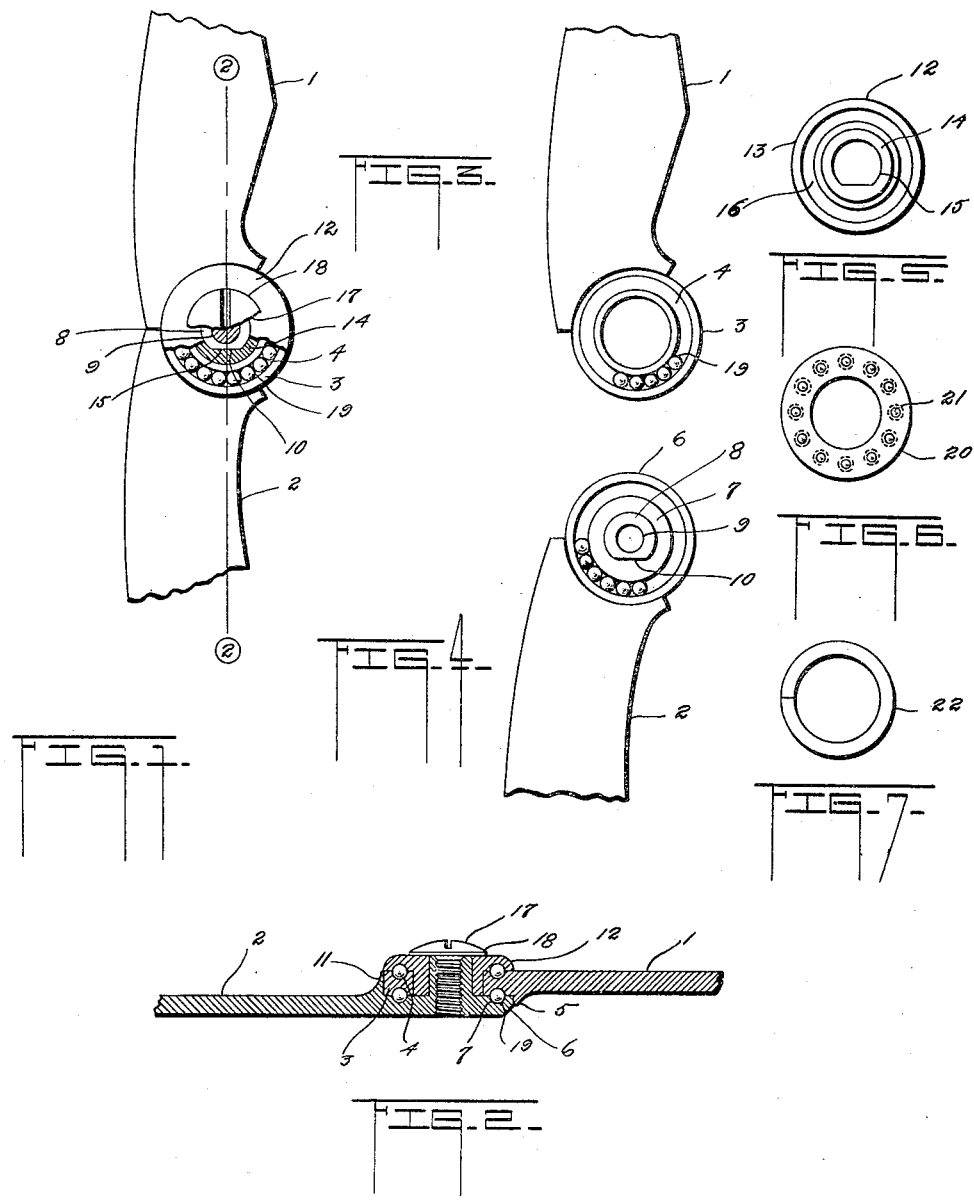

JACOB WAMBSGANS AND WILLIAM H. WAMBSGANS, OF PEORIA, ILLINOIS.

JOINT FOR ARTIFICIAL LEGS.

1,112,503.  Specification of Letters Patent.  Patented Oct. 6, 1914.

Application filed February 27, 1913. Serial No. 750,977.

*To all whom it may concern:*

Be it known that we, JACOB WAMBSGANS and WILLIAM H. WAMBSGANS, citizens of the United States, residing at Peoria, in the county of Peoria and State of Illinois, have invented certain new and useful Improvements in Joints for Artificial Legs, of which the following is a specification.

This invention relates to improvements in hinge joints particularly for use as the knee joint for artificial legs.

The principal object of this invention is the provision of such a joint which is composed of few parts, is simple in construction and has a double antifriction bearing to reduce the wear on the various parts of the joint.

In the drawing:—Figure 1 is a side elevation of a joint constructed according to our invention, parts being broken away; Fig. 2 is a section on line 2—2 of Fig. 1; Fig. 3 is a plan view of one member of the joint. Fig. 4 is a plan view of the other member of the joint; Fig. 5 is a bottom view of a detail; Figs. 6 and 7 are different forms of antifriction bearings.

Referring to the drawings the reference 1 designates the strap or iron constituting one member of the joint, and 2 the strap or iron forming the other member. The member 1 is provided at its extremity with a circular bearing portion or member 3, which is in the form of an annulus or ring having the circular grooves, recesses or races 4 on both sides thereof. This member 1 has the flange or shoulder 5 adjacent the bearing member 3 which flange is curved to correspond thereto. The other member 2 is provided with the circular bearing portion or member 6 in the form of a plate having the circular groove, recess or race 7 in its top face corresponding to the said grooves or recesses 4. This bearing member 6 is further provided with the stud or extension 8 centrally located and provided with the screw threaded aperture 9. This stud or extension is preferably D-shaped having a flat side or face 10. The curved bearing shoulder or flange 11 is provided adjacent said bearing portion or member 6. An additional member 12 is provided having a circular portion 13 to provide a cap or plate and a stud or extension 14 apertured as at 15 to correspond to and fit on the stud or extension 8, thereby providing a bearing sleeve or bushing which fits in the annular member 6. The inner face of the cap or plate 13 is grooved or recessed as at 16 to provide a race corresponding to the race 4. The securing or assembling member is provided in the form of the screw 17 adapted to fit the aperture 9 and having the extended head 18 adapted to bear on the outer face of the member 12 to force the parts together.

The parts are adapted to be assembled in the manner shown with suitable antifriction bearings in the races formed by the grooves. As a preferred form we have illustrated the loose balls 19, while in Fig. 6 is shown the retainer 20 for holding a plurality of balls 21. Or as is shown in Fig. 7 a ring 22 may be used, it being understood that any of the bearing members may fit in the races.

It is therefore evident that we have provided a joint wherein the joint operates easily and is freed from wear due to the antifriction bearing. Further that the construction includes the fewest possible parts which may be readily replaced if necessary and which may be easily adjusted.

What we claim is:—

1. A hinge joint for artificial limbs, including a member having a bearing member or plate with a stud provided centrally thereon and having an annular groove or recess, a second member having an annular bearing member provided with a groove or recess on each side thereof and having an enlarged aperture therethrough, an additional member having a cap portion provided with an annular groove or recess and a stud or extension, said stud or extension fitting in said enlarged aperture in said annular bearing member and having an aperture to receive said first mentioned stud, antifriction balls positioned in the races formed by said grooves or recesses and securing means connected to said first mentioned stud and bearing on the outside of the cap portion of said additional member.

2. A hinge joint for artificial limbs, including a member having a circular bearing member or plate with a stud provided centrally thereon and having an annular groove or recess, said stud having a flat face and a screw threaded aperture, a second member having an annular bearing member provided with a groove or recess on each side thereof, an additional member having a cap portion provided with an annular groove or recess and a stud or extension, said stud or extension fitting in said annular bearing member and having a flat sided aperture to receive said first mentioned stud, antifriction balls positioned in the races formed by said grooves or recesses and a screw member passing through said members and engaging said screw threaded aperture, said screw member having an enlarged head and adapted to bear on said additional member, the end of said first mentioned stud being flush with the outside face of said additional member when the joint is assembled.

3. A hinge joint for artificial limbs, including a member having a circular bearing member or plate provided with a circular stud having a centrally located screw threaded aperture and a flat face, said bearing member or plate having an annular groove or recess, a second member having an annular bearing member provided with an annular groove or recess on each side thereof, an additional member having a cap portion provided with an annular groove or recess on its inner face and also having a depending stud or extension, said stud or extension fitting in said annular bearing member and having a flat sided aperture to receive said first mentioned stud, ball bearings positioned in the races formed by said groove or recess, and an assembling member comprising a screw threaded bolt adapted to enter said screw threaded aperture, and an enlarged head adapted to bear on said additional member.

In testimony whereof we affix our signatures in presence of two witnesses.

JACOB WAMBSGANS.
WILLIAM H. WAMBSGANS.

Witnesses:
GEORGE T. BEAN,
MILDRED T. BOMAN.

---

Copies of this patent may be obtained for five cents each, by addressing the "Commissioner of Patents, Washington, D. C."